United States Patent
Tsujimoto et al.

[11] 3,893,133
[45] July 1, 1975

[54] ELECTRICALLY CONTROLLED SHUTTER FOR USE IN PHOTOGRAPHIC CAMERAS

[75] Inventors: Kayoshi Tsujimoto; Toru Matsui, both of Osaka, Japan

[73] Assignee: Minolta Camera Kabushiki Kaisha, Osaka, Japan

[22] Filed: Oct. 5, 1973

[21] Appl. No.: 403,831

[30] Foreign Application Priority Data
Oct. 7, 1972  Japan............................. 47-100323
June 23, 1973  Japan............................. 48-70464

[52] U.S. Cl............. 354/24; 354/51; 354/60 R; 354/266
[51] Int. Cl............. G03b 7/08; G03b 9/58
[58] Field of Search............ 354/24, 36, 48, 50, 51, 354/60, 152, 266, 267

[56] References Cited
UNITED STATES PATENTS

| | | | |
|---|---|---|---|
| 3,554,104 | 1/1971 | Winkler | 354/38 |
| 3,668,987 | 6/1972 | Hayashi | 354/51 |
| 3,688,657 | 9/1972 | Ueda | 354/50 |
| 3,693,527 | 9/1972 | Matsuda | 354/51 |
| 3,791,277 | 2/1974 | Kobori et al. | 354/51 |

*Primary Examiner*—Joseph F. Peters, Jr.
*Attorney, Agent, or Firm*—Watson, Cole, Grindle & Watson

[57] ABSTRACT

In an electrically controlled shutter for use in a photographic camera having a first timing circuit for setting the timing commensurate with the brightness of a photographic object, a second timing circuit for manually setting the timing and a first manually operative member for selectively connecting either the first or second timing circuit to an exposure time control circuit, whereby the exposure time may be controlled by means of the timing circuit selected upon the releasing operation of the first manually operative member, there is disclosed a shutter provided with a second manually operative member which enables control of the exposure time by connecting the first timing circuit to the exposure time control circuit, regardless of whether the first or the second timing circuit was selected initially.

13 Claims, 4 Drawing Figures

ELECTRICALLY CONTROLLED SHUTTER FOR USE IN PHOTOGRAPHIC CAMERAS

BACKGROUND OF THE INVENTION

This invention relates to electrically controlled shutters for use in photographic cameras.

It is known that such shutters may be controlled by a timing circuit commensurate with the brightness of a photographic object as detected by a light receiving element and that such shutters may be controlled by another timing circuit which is set manually. Furthermore, it is known that such shutters may be selectively controlled by first and second timing circuits, using a manually operative member.

For example, a shutter speed dial may be used as the manually operative member. The shutter speed dial is provided with a scale graduated into a series of geometrically progressing numbers having increments of a multiple of 2, such as 1/1,000, 1/500, 1/250, 1/120, 1/60, 1/30, 1/15, 1/8, 1/4, 1/2, 1 second. There also may be another scale for selecting the first timing circuit and yet another scale providing the photographing value. For this purpose, the shutter speed dial is graduated through 360° on its circumference.

Accordingly, when one of the graduations for manual setting has been set and yet the automatic exposure is desired by selecting the first timing circuit, then the shutter speed dial has to be rotated almost through 360°. Such an operation is troublesome itself. Additionally, in the case of photographing in an emergency case, there may be insufficient time to make the necessary settings that the opportunity for such an operation is lost.

Accordingly, it is an object of the invention to provide an electrically controlled shutter for use in photographic cameras, which is provided with a first manually operative member settable to a desired position for setting exposure time and a second manually operative member for connecting a first timing circuit to an exposure time control circuit, thereby permitting the immediate automatic exposure photography by the operation of an operating member, regardless of whether automatic or manual exposure control is selected.

It is another object of the invention to provide an electrically controlled shutter for use in photographic cameras, having a first timing circuit adapted to set the shutter timing commensurate with the brightness of a photographic object detected by a light receiving element, and a second timing circuit adapted to set the timing manually, whereby either one of the timing circuits may be selectively connected to an exposure time control circuit by a manually operative member. Another manually operative member is adapted to connect the first timing circuit to the exposure time control circuit, regardless of which one of the first or second timing circuits is selected.

These and other objects will be clear from the ensuing description taken with reference to the accompanying drawings.

SUMMARY OF THE INVENTION

To achieve the aforesaid objects, the present invention provides an electrically controlled shutter of the type which can selectively connect to the exposure time control circuit either a first timing circuit adapted to set the shutter timing commensurate with the brightness of a photographic object, or a second timing circuit adapted to set the shutter timing manually. The shutter mechanism comprises a first manually operative member settable to a desired position for selecting the exposure time and a second manually operative member to effect automatic exposure control, also commensurate with the brightness of a photogtaphic object, by connecting the first timing circuit to the exposure time control circuit. The second manually operative member is provided with a switch means to break the connection of the exposure time control circuit with the second timing circuit when the first manually operative member selects the second timing circuit by its operation, and then connects the first timing circuit therewith.

In addition, the second manually operative member operates the aforesaid switch means, while also triggering the first timing circuit upon releasing of the shutter.

Further, the first timing circuit is provided with a light measuring circuit which produces an output voltage proportional to the logarithmic value of the brightness of the scene light by receiving the scene light which has been transmitted through the objective lens of the camera and also includes a storage means connected via the switch means to the light measuring circuit. The first timing circuit starts the timing by means of an electric current which has been antilogarithmically converted from the stored voltage when the first timing circuit is triggered, while the switch means is opened by the first operation of the second manually operative member to thereby store the voltage in the storage means. Additionally, the camera release mechanism and the subsequent release of the shutter plus the triggering of the first timing circuit may be effected in synchronous fashion by means of the second operation of the second manually operative member, with the first timing circuit connected to the exposure time control circuit.

The first and second sequential operations of the second manually operative member automatic exposure time control photographing by the normally stored voltage. The voltage which has been stored by the first operation may be sustained by carrying out the first operation and, after an interval, completing the second operation of the second manually operative member.

Accordingly, for counter-light photography where the brightness of a photographic object can hardly be measured at the picture taking position, the second manually operative member is first operated with the camera close to the object and then the second operation is carried out at the picture taking position, whereby a proper exposure time in accordance with the brightness of a photographic object may be obtained.

DETAILED DESCRIPTION OF THE INVENTION

Figure 1:
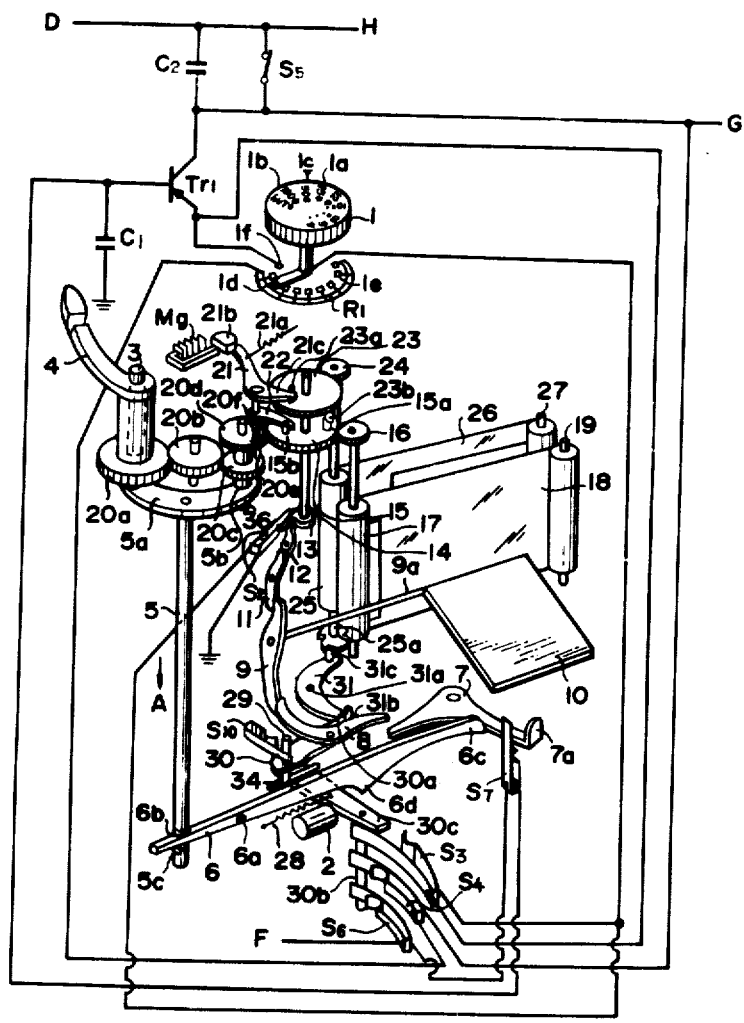
FIG. 1 is a combined electrical schematic and mechanical layout (in perspective) of one embodiment of the invention.
Figure 2:
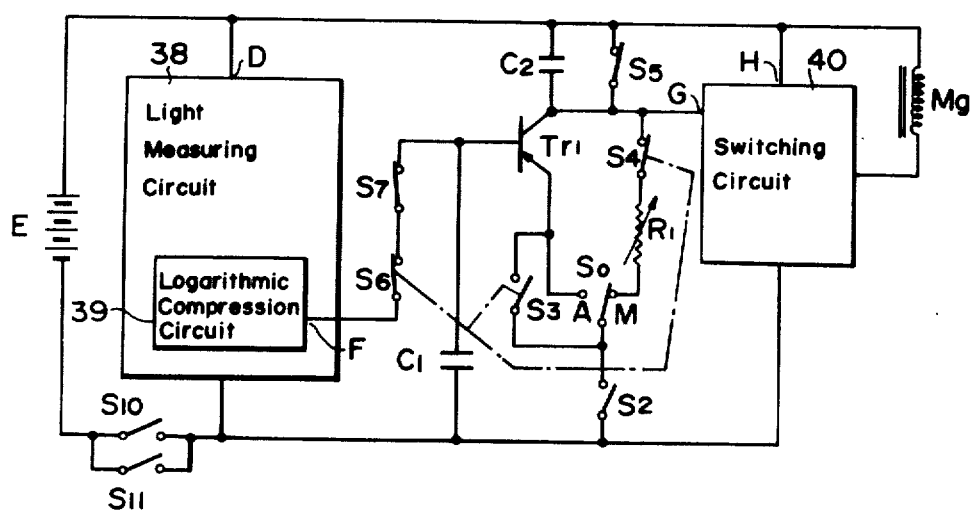
FIG. 2 is a circuit for the embodiment of FIG. 1 in combined block diagram and electrical schematic format.

Referring now to FIG. 1 which shows the essential parts of one embodiment of the invention for a single lens reflex camera. The light which has been transmitted through a photographic lens (not shown) is incident upon a light receiving element in light measuring circuit 38 as shown in FIG. 2, by the operation of a first manually operative member for selecting exposure control (such as dial 1). The output of light measuring circuit 38 is stored via logarithmic compression circuit 39 in a storage capacitor $C_1$, whereby automatic exposure time control photography is effected in accordance with the stored voltage or by the manual setting of dial 1 for an exposure time using no light measuring circuit.

Release button 3 is slidable in a vertical direction within a cylindrical hollow shaft of winding lever 4 and mounted on metal support 5a of T-shaped release rod 5, such that release rod 5 may move vertically in cooperation with the vertical movement of release button 3. Notch 5c is formed in the lower portion of release rod 5 and engages with notch 6b formed in the end of camera release lever 6. Pivot 6a of the camera release lever 6 is rotatably journaled in the camera body, while the other end of lever 6 engages with diaphragm operating lever 7 having a tendency to rotate in a clockwise direction. Built-up portion 6d is formed on camera releasing lever 6 at its lower edge portion.

Formed on one arm of diaphragm operating lever 7 is operating piece 7a which is adapted to engage with a diaphragm adjusting member (not shown) of the camera in a manner well known to those skilled in the art, while the other arm thereof is engageable with intermediate lever 8. Intermediate lever 8 engages with mirror lever 9 having a tendency to rotate in a counterclockwise direction as viewed in FIG. 1 and has shaft 9a, to which is rigidly mounted movable mirror 10.

Mirror lever 9, when rotated in a counterclockwise direction, is engageable via lever 11 with shutter release lever 12, which is removably engageable with locking cam 13 mounted on shutter shaft 14, to which is rigidly mounted winding gear 15.

Figure 3:
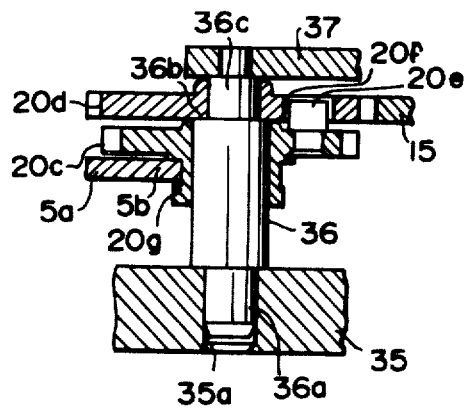
FIG. 3 is a longitudinal cross-sectional view of a winding member and a winding gear used in the embodiment.

With reference to FIGS. 1 and 3, gear 20a is connected through a cylindrical hollow shaft with winding lever 4 and gear 20c normally meshes with gear 20a via gear 20b. Shafts 36a and 36c are slidably and rotatably journaled in cylindrical hollow shaft 36 formed on partition plates 35 and 37 of the camera body, as shown in FIG. 3. Fitted in annular notch 20g formed in a collar portion of said cylindrical shaft 36 is fork 5b formed on metal piece 5a of the release rod 5. Pin 20e is mounted in a projecting relation on gear 20c and is loosely fitted in arcuate groove 20f of gear 20d and shaft 36c is rotatably journaled on shoulder portion 36b of cylindrical shaft 36. Gear 20d normally meshes with winding gear 15.

Anchored in the upper surface of winding gear 15 are connecting pin 15a and operating pin 15b and winding gear 15 meshes with forward curtain gear 16 mounted coaxially with forward curtain shaft 17. One end of forward curtain 18 is wound around forward curtain shaft 17 and the other end of forward curtain 18 is wound around curtain winding shaft 19 which is biased to wind the forward curtain.

Attached to the undersurface of gear 23 mounted on shutter shaft 14 is connecting pin 23b engageable with connecting pin 15a. Locking pin 23a is attached to the top surface of gear 23. Gear 23 meshes with rear curtain gear 24 coaxial with rear curtain shaft 25, around which is wound one end of rear curtain 26 and the other end thereof is wound around rear curtain winding shaft 27.

Rear curtain locking lever 21, provided with locking arm 21c which is engageable with locking pin 23a of gear 23 in its locked position, has a tendency to rotate in a clockwise direction under the action of spring 21a. The other end of lever 21 has armature 21b facing electromagnet Mg which is operated by the output from an electric control circuit. Operating lever 22 is mounted on a shaft on which is also mounted rear curtain locking lever 21. Lever 22 is engageable with pin 15b of winding gear 15 in its locked position, whereby rear curtain locking lever 21 is rotated against the force of spring 21a in a counterclockwise direction such that armature 21b contacts electromagnet Mg, while locking arm 21c engages with locking pin 23a to thereby lock gear 23.

Fitted in guide groove 34 provided in the camera body is pin 29 attached to L-shaped operating lever 30 which has a tendency to abut and engage with operating button 2, which is a second manually operative member, by the force of spring 28. Thus, when operating button 2 is depressed, L-shaped operating lever 30 is slidingly moved to the right against the force of spring 28, whereby electric power source switch S10, which has a tendency to be closed by pin 29, is closed. Pin 30a attached to L-shaped operating lever 30 moves in a path within which there is notch 31b formed in retaining lever 31 which is rotatably journaled on shaft 31a and has a counterclockwise rotational tendency. Pin 30a is adapted to engage with notch 31b, and pin 31c of retaining lever 31 engages with releasing cam 25a which is coaxial with rear curtain shaft 25. Accordingly, when L-shaped operating lever 30 is slidingly moved to the right as has been described hereinbefore, pin 30a engages with notch 31b and is retained therein. Furthermore, when operating lever 30 is moved a distance further, then leading edge 30c thereof engages with built-up portion 6d of camera release lever 6 to thereby rotate the same in a counterclockwise direction. Operating pin 30b is adapted to engage with the movable contacts of switch S3, having a tendency to close, and with switches S4 and S6 having a tendency to open. However, switch S3 is in an open position and switches S4 and S6 are in closed positions in FIG. 1 and the rightward movement of operating lever 30 will cause switches S3, S4 and S6 to assume opposite positions, respectively.

Referring now to FIG. 2 which shows an embodiment of the circuit according to the present invention, light measuring circuit 38, connected via parallel electric power source switches S10 and S11 to electric power source E, includes a light receiving element (not shown), and receives through a photographic lens the light from a photographic object. Light measuring circuit 38 produces an electric current commensurate with the scene light which is fed as an input to logarithmic compression circuit 39, which generates an output voltage proportional to the logarithmic value of the current.

The output voltage from logarithmic compression circuit 39 charges storage capacitor C1 through switches S6, S7, which are connected in series with each other. Switch S6 is a voltage sustaining switch and hence normally closed, while it is opened and maintained open by the operation of operating button 2. Switch S7 is a storage switch which is normally closed and, when release button 3 is depressed as in FIG. 1, is opened immediately before movable mirror 10 is rotated from the viewing position to a picture taking position in cooperation with the clockwise rotation of diaphragm operating lever 7.

Transistor Tr1, to the base of which is connected storage capacitor C1, produces a collector current which is the antilogarithm of the base current. The collector of transistor Tr1 is connected to time constant capacitor C2 and switch S5, which is provided in parallel thereto. The emitter of transistor Tr1 is connected to terminal A of switch S0, having a contact which is adapted to switch between automatic terminal A and manual terminal M, and is connected via switch S3 to one terminal of switch S2. Switch S2 is normally open and is a trigger switch which is adapted to be closed in connection with the starting of the travel of the forward shutter curtain but in cooperation with locking cam 13. The mechanical configuration of switch S5, which is normally closed and arranged in parallel with time constant capacitor C2, is not shown. However, switch S5 is an electric discharging switch for capacitor C2, and is adapted to be opened in cooperation with the downward movement of release rod 5 in a manner well known to those skilled in the art.

Connected between manual terminal M of switch S0 and the collector of transistor Tr1 is variable resistor R1, the resistance of which varies in accordance with the rotation of dial 1, as well as switch S4 connected in series to resistor R1. Switch S4 is normally closed as has been described earlier and is adapted to be opened in connection with the depression of operating button 2, while switches S3, S4 and S6 are operated by operating pin 30b of operating lever 30.

The collector of transistor Tr1 is connected to switching circuit 40, and the output thereof will demagnetize electromagnet Mg, when the charging voltage of time constant capacitor C2 reaches a given level.

While the electrically controlled shutter according to the present invention is constructed as described above, its operation and the advantages thereof are as follows:

1. Film winding and shutter cocking:

When winding lever 4 is rotated in a counterclockwise direction, one frame of the film will be wound and, further, gears 20a, 20b, 20c will rotate therewith, and thereby gear 20d will rotate by means of pin 20e fitted in arcuate groove 20f of gear 20d. As a result, winding gear 15 will rotate in a clockwise direction together with shutter shaft 14. Then gear 23 will rotate via connecting pins 15a and 23b in the same direction as gear 15, whereby forward and rear curtains 18, 26 are wound around their respective curtain shafts 17, 25. In the final stage of the winding operation, operating pin 15b rotates rear curtain locking lever 21 in a counterclockwise direction by the rotation of operating lever 22. This causes armature 21b to abut with electromagnet Mg, while locking cam 13, which is adapted to rotate integrally with shutter shaft 14, engages with shutter release lever 12, thereby causing trigger switch S2 to open. Locking pin 23a engages with rear curtain locking lever 21 to lock it in position.

2. Automatic-exposure-time-control photography by using TTL light measurement:

In this case, AUTO graduation 1b is matched with index 1c on the dial of shutter speed setting member 1. Then, brush 1d is disconnected from variable resistor R1, then in contact with the terminal 1f, thereby connecting the contact of switch S0 with automatic terminal A.

When release button 3 is depressed, electric-power-source switch S11 is first closed and then electromagnet Mg is excited to attract armature 21b, whereupon discharging switch S5 is opened to enable the charging of capacitor C2. Subsequently, pin 20e on gear 20c will move downwardly with the downward movement of metal support 5a and withdraw from arcuate groove 20f, such that gears 20c, 20d are disengaged, while camera release lever 6 is disengaged from diaphragm operating lever 7. This causes diaphragm operating lever 7 to rotate in a clockwise direction, thereby causing storage switch S7 to open, so the output voltage of logarithmic compression circuit 39 will be stored by storage capacitor C1.

Subsequently, lever 9 rotates via intermediate lever 8, whereby movable mirror 10 shifts from its viewing position to the picture taking position, while shutter release lever 12 releases the locking of locking cam 13 by means of lever 11, whereby shutter shaft 14 is released to rotate. Then, trigger switch S2 is closed simultaneously with the starting of the travel of forward curtain 18. Then capacitor C2 commences to be charged by the collector current of transistor Tr1 which is adapted to antilogarithmically convert the storage voltage of storage capacitor C1. At this time, electromagnet Mg is maintained excited, such that gear 23 is locked so as not to be rotated by the release of rear curtain locking lever 21. When the charging voltage of capacitor C2 reaches a given level, then the connection of the switching circuit will be reversed, interrupting the exciting current to electromagnet Mg, and then releasing the locking of rear curtain locking lever 21 by locking pin 23a and causing the rear curtain to travel, thereby completing the exposure.

3. Photographing with manual exposure time set:

When an arbitrarily set exposure time 1a on the dial of selecting member 1 is aligned with index 1c, brush 1d determines the corresponding resistance value of variable resistor R1 and is disconnected from terminal 1f. In other words, as shown in FIG. 2, the contact of switch S0 is connected to manual terminal M, thereby connecting the resistance value of variable resistor R1 into the circuit.

As a result, electric power source switch S11 is closed by the releasing operation, and then the locking of locking cam 13 is released and, in turn, trigger switch S2 is closed; the collector current through transistor Tr1 is interrupted, as switch S3 and switch S10 are opened; and capacitor C2 is charged by the current flowing through switch S4 in its closed position, the amount of that current being dependent on resistor R1. Thus, the exposure time which has been set manually may be adjusted for the timing when capacitor C2 is charged to a given level with the current flowing through variable resistor R1, thereby terminating exposure.

As is apparent from the foregoing description, automatic exposure time control and manual exposure time control may be selected by means of first manually operative member 1. However, in the case of an emergency or urgent photographing, there is no time to set the exposure time by means of first manually operative member 1. Therefore, it is necessary to provide for automatic-exposure-time-control photography, regardless of whether first manually operative member 1 is in the automatic exposure time control mode or any shutter speed is selected in the manual exposure time control mode.

4. Automatic exposure time control photography in an emergency case:

In this case, operating button 2 is depressed with the proviso that the film winding operation and the shutter cocking operation have been completed. This causes L-shaped operating lever 30 to move to the right and thereby pin 29 thereof will close electric power switch S10, thus bringing the light measuring circuit into operation. At this time, since both voltage sustaining switch S6 and storage switch S7 are closed, storage capacitor C1 will be charged with the voltage commensurate with the brightness of a photographic object. Then, operating pin 30b will close switch S3 due to the depression of operating button 2, thereby opening switches S4 and S6. Opened switch S6 causes the aforesaid charged voltage to be sustained by storage capacitor C1. Closed switch S3 and opened switch S4 cause time constant capacitor C2 to be connected to transistor Tr1 and variable resistor R1 to be disconnected, thus enabling automatic exposure time control. Simultaneously herewith, pin 30a of operating lever 30 engages with notch portion 31b, whereby the return movement of operating lever 30 will be prevented. When operating button 2 is depressed a step further, then leading edge 30c of operating lever 30 engages with built-up portion 6d of camera release lever 6, thereby rotating that lever in a counterclockwise direction, such that the engagement of notch portions 6d and 5c will bring about the same condition the same as with the depression of release button 3, thereby enabling automatic exposure control photography in the same manner as that described in paragraph (2) above.

Also, release cam 25a rotates pin 31c of retaining lever 31, thereby disengaging pin 30a from notch 31b, with the result that operating lever 30 is released and hence returns by the force of spring 28.

5. Photography in which there is sustained the brightness of only the specific photographic object in the scene:

In this case, the camera is placed in the vicinity of the specific photographic object and then operating button 2 is depressed to a first step, with only the light from the specific object being incident onto the photographic lens. Thus, when voltage sustaining switch S6 is opened in the same manner as described in paragraph (4), then the brightness of the specific object is sustained in storage capacitor C1 and then L-shaped lever 30 is retained so as not to return to its initial position by means of the engagement of pin 30a with notch 31b. At this time, however, leading edge 30c thereof is maintained in engagement with built-up portion 6d. Then, after the camera is spaced a proper distance from the specific object, operating button 2 is further depressed. Then, as in the case described in paragraph (4) above, automatic exposure time control is effected commensurate with the brightness of only the specific object. Alternatively, if operating button 2 is depressed a step further than the first step, with release button 3 depressed, then the desired photograph may also be effected.

With the aforesaid first embodiment, photography in accordance with that described in paragraph (5) is effected by the first and second step operations of operating button 2. However, if such operations are mistakenly carried out continuously the photographic operation in accordance with that described in paragraph (4) will occur. Thus, focussing will not be effected, since the camera is placed in the vicinity of the photographic object, resulting in an unfocussed photograph. Furthermore, provision of the click motion for operating button 2 so as to distinguish the aforesaid first and second step operations from each other, will cause camera movement and a blur upon the photograph when a photograph is taken under the conditions described in paragraph (4).

Figure 4:
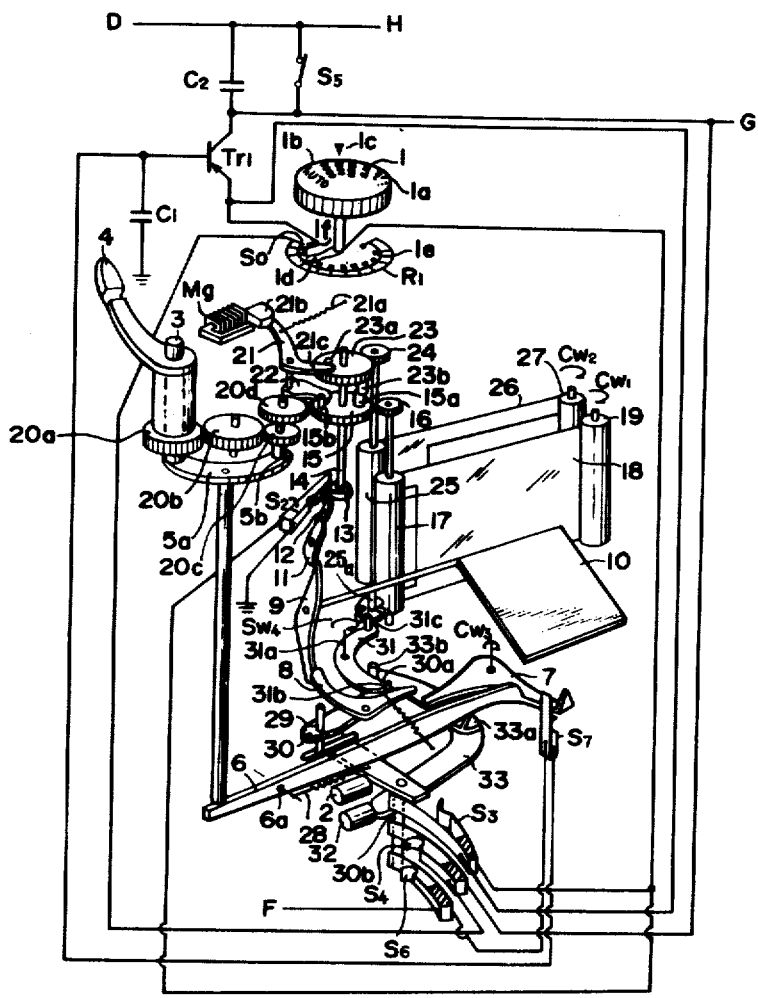
FIG. 4 is a combined electrical schematic and mechanical layout (in perspective) of another embodiment of the invention.

The second embodiment of the invention shown in FIG. 4 prevents such camera motion because the release operation is not effected by means of operating button 2. Like numerals signify like parts throughout the first and second embodiments of the invention, and hence a description of such common components is unnecessary. Thus, a description will be given only of such parts in the second embodiment which are different from those in the first embodiment.

In the second embodiment, the lower end of release rod 5 is located on the left end of camera release lever 6, while rod 5 and lever 6 are brought into engagement with each other, during the downward movement of rod 5. However, the notches used in the first embodiment are not used in the second embodiment. Furthermore, camera release lever 6 is not formed with a projection such as is adapted to engage L-shaped operating lever 30, when that lever is moved.

Accordingly, as shown in FIG. 4, when operating button 2 is depressed, then operating lever 30 is moved to the right, whereby normally opened switch S3 is closed and normally closed switches S4 and S6 are opened by means of operating pin 30b of lever 30. The pin 30a of operating lever 30 engages with notch 31b of retaining lever 31. Thus operating lever 30 is retained in its righthand position, and thereby the aforesaid first and second step operations may be carried out. However, even if operating button 2 is depressed in any manner thereafter, the releasing operation by effecting the second step operation will not take place. In other words, the release operation as described in the previous paragraphs (4) and (5) will be achieved only by means of the depression of the release button.

When the interruption of the photographing is desired after bringing the camera into the condition ready for photography in accordance with paragraphs (4) and (5) by depressing operating button 2, then release button 32 is depressed. Release lever 33, the end of which is engageable with release button 32, has shaft 33a rotatably journaled in the camera body, while pin 33b on the other end thereof is engageable with retaining lever 31 which is adapted to retain L-shaped operating lever 30 in its right-hand position. Thus, when release button 32 is depressed, then release lever 33 will be rotated in a counterclockwise direction, thereby rotating retaining lever 31 in a clockwise direction against its reverse rotational tendency, whereby pin 30a will be disengaged from notch 31b, thus allowing operating lever 30 to return to its initial position by the force of spring 28.

What is claimed is:

1. An electrically controlled shutter for a photographic camera, comprising:
   a first timing circuit for setting exposure timing commensurate with the brightness of a photographic object;
   a second timing circuit for manually setting exposure timing;
   an exposure time control circuit for controlling exposure in accordance with the exposure timing of said first or second timing circuit;
   means for closing the shutter in response to said exposure time control circuit;
   a first manually operative member settable to a desired position for selecting exposure time and for selectively connecting at least said second timing circuit to said exposure time control circuit; and
   a second manually operative member movable from a rest position to an operating position for connecting said first timing circuit to said exposure time control circuit to override the control setting of said second timing circuit;
   first and second shutter releasing members; and
   said second manually operative member being additionally manually movable to a third position enabling said second shutter releasing member to release the shutter independently of said first shutter releasing member with said first timing circuit connected to said exposure time control circuit.

2. An electrically controlled shutter as in claim 1, wherein said shutter further comprises:
   a retaining member for retaining said second manually operative member in said operating position.

3. An electrically controlled shutter as in claim 1, wherein said shutter further comprises:
   means for releasing said second manually operative member from being retained in said operating position thereof by said retaining member.

4. An electrically controlled shutter as in claim 1, wherein said shutter further comprises:
   a member for manually releasing said second manually operative member from being retained in said operating position thereof by said retaining member.

5. An electrically controlled shutter as in claim 1, wherein said camera is a single lens reflex camera provided with a mirror movable to a viewing position and to a picture taking position and with an adjusting means for adjusting a diaphragm aperture from the full open position to a preset aperture setting, and wherein the change from the viewing condition to the picture taking condition is in cooperation with the shutter release operation, wherein said shutter further comprises:
   a light measuring circuit including a light receiving element for receiving scene light transmitted through an objective lens of the camera and for producing an output voltage proportional to the logarithmic value of the luminance at the light receiving surface of said light receiving element;
   means for storing said output voltage, said first timing circuit establishes timing by antilogarithmically converting said stored output voltage;
   a first switch means connected between said light measuring circuit and said means for storing and having a tendency to be closed and opened before said mirror moves from said viewing position to said picture taking position in cooperation with the shutter release operation; and
   a second switch means connected to said light measuring circuit and said means for storing in series with said first switch means and said second switch means is closed and opened when said second manually operative member is in said rest position and in said operating position thereof respectively.

6. An electrically controlled shutter as in claim 1 wherein said second manually operative member moves through said operating position to said third position from said rest position.

7. An electrically controlled shutter as in claim 1 wherein said first manually operative member is settable to another position for connecting said first timing circuit to said exposure time control circuit.

8. An electrically controlled shutter for a photographic camera, comprising:
   a first timing circuit for setting exposure timing commensurate with the brightness of a photographic object;
   a second timing circuit for manually setting exposure timing;
   an exposure time control circuit for controlling exposure in accordance with the exposure timing of said first or second timing circuit;
   means for closing the shutter in response to said exposure time control circuit;
   a first manually operative member settable to a desired position for selecting exposure time and for selectively connecting at least said second timing circuit to said exposure time control circuit; and
   a second manually operative member for setting automatic exposure control and for connecting said first timing circuit to said exposure time control circuit, said second manually operative member is at least movable from a rest position to an operating position to connect said first timing circuit to said exposure time control circuit for over-riding the setting of said first manually operative member;
   a retaining member for retaining said second manually operative member in said operating position; and
   means for releasing said second manually operative member from being retained in said operating position thereof by said retaining member.

9. An electrically controlled shutter as in claim 8 wherein said first manually operative member is settable to another position for connecting said first timing circuit to said exposure time control circuit.

10. An electrically controlled shutter as in claim 8 wherein said means for releasing is a third manually operative member.

11. An electrically controlled shutter as in claim 10 wherein said first manually operative member is settable to another position for connecting said first timing circuit to said exposure time control circuit.

12. An electrically controlled shutter for a photographic camera of the single lens reflex type provided with a mirror movable to a viewing position and to a picture taking position and with an adjusting means for adjusting a diaphragm aperture from the full open position to a preset aperture setting, and wherein the change from the viewing condition to the picture taking condition is in cooperation with the shutter release operation, comprising:

- a first timing circuit for setting exposure timing commensurate with the brightness of a photographic object;
- a second timing circuit for manually setting exposure timing;
- an exposure time control circuit for controlling exposure in accordance with the exposure timing of said first or second timing circuit;
- means for closing the shutter in response to said exposure time control circuit;
- a first manually operative member settable to a desired position for selecting exposure time and for selectively connecting at least said second timing circuit to said exposure time control circuit;
- a second manually operative member for setting automatic exposure control and for connecting said first timing circuit to said exposure time control circuit, said second manually operative member is at least movable from a rest position to an operating position to connect said first timing circuit to said exposure time control circuit for overriding the setting of said first manually operative member;
- a light measuring circuit including a light receiving element for receiving scene light transmitted through an objective lens of the camera and for producing an output voltage proportional to the logarithmic value of the luminance at the light receiving surface of said light receiving element;
- means for storing said output voltage, said first timing circuit establishing timing by antilogarithmically converting said stored output voltage;
- a first switch means connected between said light measuring circuit and said means for storing and having a tendency to be closed and opened before said mirror moves from said viewing position to said picture taking position in cooperation with the shutter release operation; and
- a second switch means connected to said light measuring circuit and said means for storing in series with said first switch means and said second switch means is closed and opened when said second manually operative member is in said rest position and in said operating position thereof, respectively.

13. An electrically controlled shutter as in claim 12, wherein said first manually operative member is adapted to selectively connect said first timing circuit to said exposure time control circuit and said second manually operative member connects said first or second timing circuit selected by said first manually operative member to said exposure time control circuit in the rest position thereof.

* * * * *